United States Patent
Lin et al.

(10) Patent No.: US 11,360,344 B1
(45) Date of Patent: Jun. 14, 2022

(54) LIQUID CRYSTAL DISPLAY PANEL AND LIQUID DISPLAY DEVICE

(71) Applicant: JRD COMMUNICATION (SHENZHEN) LTD., Shenzhen (CN)

(72) Inventors: Ke Lin, Shenzhen (CN); Yang Yu, Shenzhen (CN); Jitao Ma, Shenzhen (CN); Zhuwei Qiu, Shenzhen (CN)

(73) Assignee: JRD COMMUNICATION (SHENZHEN) LTD., Shenzhen (CN)

(*) Notice: Subject to any disclaimer, the term of this patent is extended or adjusted under 35 U.S.C. 154(b) by 0 days.

(21) Appl. No.: 17/203,766

(22) Filed: Mar. 17, 2021

(30) Foreign Application Priority Data

Feb. 9, 2021 (CN) .......................... 202110178557.4

(51) Int. Cl.
*G02F 1/1335* (2006.01)
*G02F 1/1343* (2006.01)
*G02F 1/1333* (2006.01)
*G02F 1/137* (2006.01)

(52) U.S. Cl.
CPC ........ *G02F 1/133514* (2013.01); *G02F 1/137* (2013.01); *G02F 1/13439* (2013.01); *G02F 1/133302* (2021.01); *G02F 1/133528* (2013.01); *G02F 1/133553* (2013.01); *G02F 1/133616* (2021.01); *G02F 1/133618* (2021.01); *G02F 1/134309* (2013.01); *G02F 2203/02* (2013.01)

(58) Field of Classification Search
None
See application file for complete search history.

(56) References Cited

U.S. PATENT DOCUMENTS

| 8,345,343 | B2 | 1/2013 | Kim et al. |
| 8,416,365 | B1* | 4/2013 | Rosenberg ........ G02F 1/133528 349/64 |
| 2001/0033350 | A1* | 10/2001 | Kobayashi ........ G02F 1/133514 349/106 |

(Continued)

FOREIGN PATENT DOCUMENTS

| CN | 105301831 A | 2/2016 |
| CN | 108107626 A | 6/2016 |

(Continued)

OTHER PUBLICATIONS

European Search Report, Application No. 21162682.5, dated Sep. 22, 2021(8 pages).

(Continued)

*Primary Examiner* — Ryan Crockett

(57) ABSTRACT

The present disclosure provides a liquid crystal display panel and a liquid crystal display device, including a first substrate; a second substrate; a liquid crystal layer, disposed between the first substrate and the second substrate; a reflective layer, disposed on a side of the first substrate facing the liquid crystal layer; and a color filter layer, disposed on the first substrate and covering the reflective layer. When light passes through the second substrate reaching the color filter layer, the reflective layer is configured to reflect the light, which is filtered by the color filter layer, to the second substrate. The liquid crystal display panel and the liquid crystal display device emit light without a light source, having a reduced loss rate of the light, an increased light utilization rate, and an increased light reflectivity.

16 Claims, 4 Drawing Sheets

(56) References Cited

U.S. PATENT DOCUMENTS

| | | | |
|---|---|---|---|
| 2007/0013839 A1 | 1/2007 | Rho | |
| 2011/0134373 A1* | 6/2011 | Kim | G02F 1/1334 |
| | | | 349/93 |
| 2012/0069425 A1* | 3/2012 | Sato | G02F 1/167 |
| | | | 359/296 |
| 2015/0185556 A1* | 7/2015 | Arai | G02F 1/1368 |
| | | | 349/43 |
| 2017/0123248 A1 | 5/2017 | Ro et al. | |
| 2020/0026133 A1 | 1/2020 | Wang et al. | |
| 2020/0209678 A1 | 7/2020 | Hsu et al. | |
| 2020/0251065 A1* | 8/2020 | Hsu | G02F 1/133345 |

FOREIGN PATENT DOCUMENTS

| | | |
|---|---|---|
| CN | 106483710 A | 3/2017 |
| CN | 108957836 A | 12/2018 |

OTHER PUBLICATIONS

Chinese first office action, Application No. 202110178557,4, dated Mar. 3, 2022 (13 pages).

\* cited by examiner

LIQUID CRYSTAL DISPLAY PANEL AND LIQUID DISPLAY DEVICE

CROSS-REFERENCE TO RELATED APPLICATIONS

The present application claims the foreign priority of Chinese Patent Application No. 202110178557.4, filed on Feb. 9, 2021 in the National Intellectual Property Administration of China, the entire contents of which are hereby incorporated by reference in their entireties.

TECHNICAL FIELD

The present disclosure relates to the field of panels, and in particular to a liquid crystal display panel and a liquid crystal display device.

BACKGROUND

Mobile phones and tablet computers are electronic devices that are commonly used in daily lives, and the electronic devices are usually configured with LCD screens. Most of the LCD screens in the art include array substrates, liquid crystal layers and color filter substrates. An array substrate may include a backlight module and a light source. A color filter substrate may include a color filter. Light emitted from the light source may pass through the backlight module reaching the liquid crystal layer, and may further be redirected by liquid crystal molecules in the liquid crystal layer to reach the color filter. Subsequently, the light may pass through the color filter to present various ratios of red, green and blue colors to display various colors of an image.

Due to the requirement of eye protection, blue light carried by the light source is harmful to human eyes. To solve the problem, display manufacturers introduce a liquid crystal display, such as reflective liquid crystal display (RLCD), that does not require a backlight, or emit light without a self-luminous light source. A principle of the RLCD to emit light will be briefly described. The array substrate may be coated with a reflective layer, and the color filter substrate absorbs external ambient light. The ambient light may transmit through the color filter substrate and may further be redirected by the liquid crystal layer. Subsequently, the light may reach and may be reflected by the reflection layer of the array substrate. The light may then pass through the color filter layer for a second time, and then reach the human eyes to present an image. In this way, a loss rate of the light may be increased, thus reducing utilization of the light.

SUMMARY OF THE DISCLOSURE

According to the present disclosure, a liquid crystal display panel and a liquid crystal display device may be provided, which may reduce the rate of light loss and improve the utilization of the light for the RLCD.

Embodiments of the present disclosure provides a liquid crystal display panel including a first substrate, a second substrate and a liquid crystal layer disposed between the first substrate and the second substrate. A reflective layer may be disposed on a side of the first substrate facing the liquid crystal layer.

A color filter layer may be disposed on the first substrate and covering the reflective layer. When light passes through the second substrate reaching the color filter layer, the reflective layer is configured to reflect the light, which is filtered by the color filter layer, to the second substrate.

Embodiments of the present disclosure provides a liquid crystal display device, including a shell; the liquid crystal display panel according to any one of the above embodiments, connected to the shell; and a control module, received in the shell and configured to apply voltages to form an electric field for the liquid crystal display panel.

BRIEF DESCRIPTION OF THE DRAWINGS

Specific embodiments of the present application may be described in detail to illustrate technical solutions and other beneficial effects of the present disclosure.

DETAILED DESCRIPTION

Figure 1:
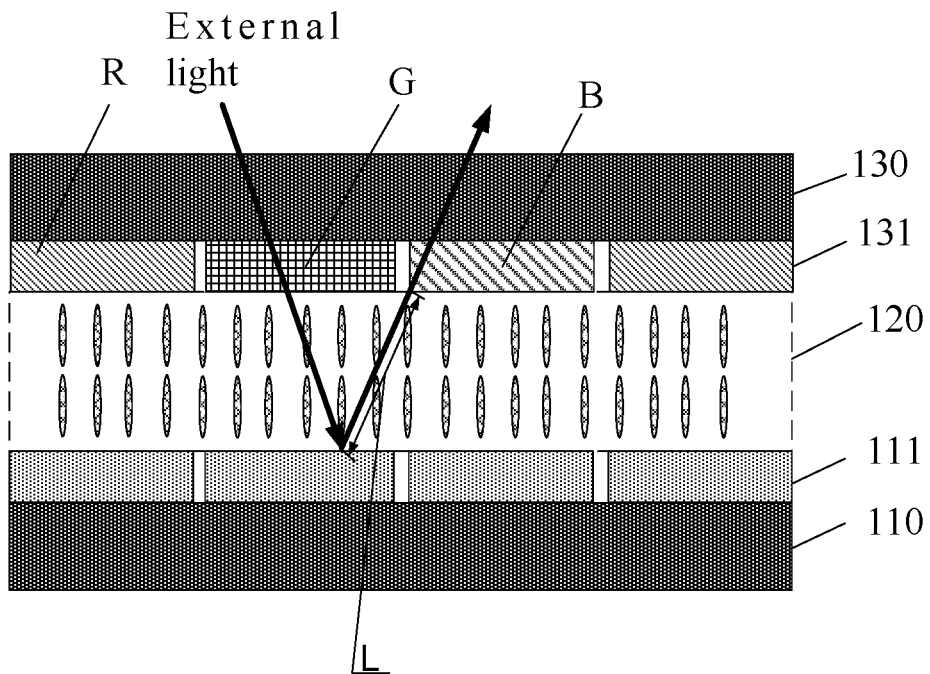
FIG. 1 is a structural schematic view of a cross section of a liquid crystal display panel in the related art.

Technical solutions of the embodiments of the present disclosure will be clearly and comprehensively described by referring to the accompanying drawings. Obviously, the embodiments described are only a part of, but not all of, the embodiments of the present disclosure. Based on the embodiments in the present disclosure, all other embodiments obtained by a skilled person in the art without creative work should fall within the scope of the present disclosure.

It should be understood that directional terms mentioned in the present disclosure, such as up, down, front, back, left, right, inside, outside, etc., are only directions when referring to the accompanying drawings. Therefore, the directional terms are used for illustrating and understanding the present disclosure, but do not limit the present disclosure. In the drawings, components of similar structure are indicated by a same reference numeral. The terms "first" and "second" are used for descriptive purposes only, and should not be interpreted as indicating or implying relative importance or implicitly specifying the number of technical features. Thus, features defined by the "first" and the "second" may explicitly or implicitly include one or more of these features.

It should be understood that the terms "on", "above" and "on top of" should be interpreted in the broadest possible way, such that "on" does not only mean "directly on something" but also means "intermediate features or layers being disposed therebetween".

As mentioned herein, the term "layer" refers to a material portion of an area having a thickness. The layer may extend over the entirety of the structure below or above, or may cover a smaller area than the structure below or above. In addition, the layer may be a region of homogeneous or non-homogeneous continuous structure having a thickness less than the thickness of the continuous structure. For example, the layer may be located between a top surface and a bottom surface of the continuous structure or between any horizontal faces at the top surface and the bottom surface. The layers may extend horizontally, vertically, and/or along an inclined surface. The substrate may be a layer, which may include one or more layers, and/or may have one or more layers above and/or below it, and the layer may include a plurality of layers.

As shown in FIG. 1, FIG. 1 is a structural schematic view of a cross section of a liquid crystal display panel in the related art. The liquid crystal display panel 100 in the related art includes an array substrate 110, a liquid crystal layer 120 and a color film substrate 130, which are arranged in sequence. A reflective layer 111 is arranged on array substrate 110. A color filter layer 131 is arranged on the color film substrate 130. The color filter layer 131 includes a red light color resistance R, a green light color resistance G and a blue light color resistance B. When external light passes through color film substrate 130 reaching the color filter layer 131, light in other wavelengths are filtered out, and light in red, light in green and light in blue light maintained. The light in red, the light in green and the light in blue light pass through the liquid crystal layer 120 reaching the reflective layer 111, reflected by the reflective layer 111, and further pass through the liquid crystal layer 120 reaching the color filter layer 131. The light may be filtered by the color filter layer 131 for a second time to present an image.

Although the liquid crystal display panel 100 does not need a backlight or a self-luminous light source, which may avoid harm to human eyes caused by the blue light emitted by the backlight or self-luminous light source and may ensure health of the human eyes. However, after the external light is filtered by the color filter layer 131, the light may be reflected by the reflective layer 111 and filtered by the color filter layer 131 for a second time. In this process, part of the light may be lost while being filtered for the second time. Further, the light that is filtered for a first time may transmit along a relatively long path to reach the reflective layer 111. For example, after the external light is filtered by the color filter layer 131, the light may transmit through a path in a distance of L to reach the reflective layer 111. While transmitting, part of the light may be lost as well, such that not all of, or not most of, the light after being filtered for the first time may reach the reflective layer 111 to be further reflected. Therefore, in the process of light transmittance, the higher the loss rate of the light, the lower the utilization of the light.

Figure 2:
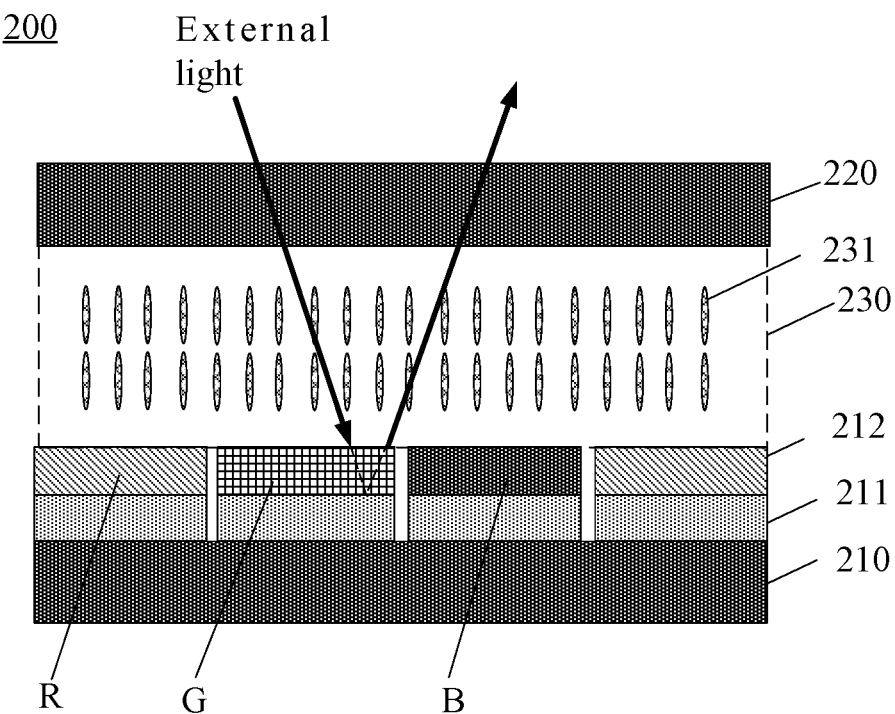
FIG. 2 is a structural schematic view of a cross section of a liquid crystal display panel according to an embodiment of the present disclosure.

As shown in FIG. 2, FIG. 2 is a structural schematic view of a cross section of a liquid crystal display panel according to an embodiment of the present disclosure. The liquid crystal display panel 200 may include a first substrate 210, a second substrate 220, and a liquid crystal layer 230 disposed between the first substrate 210 and the second substrate 220. A side of the first substrate 210 facing the liquid crystal layer 230 may be arranged with a reflective layer 211. The first substrate 210 may further be arranged with a color filter layer 212 covering the reflective layer 211. When light passes through the second substrate 220 reaching the color filter layer 212, the reflective layer 211 may reflect the light, which is filtered by the color filter layer 212, to the second substrate 220.

In detail, material for producing the reflective layer 211 may include a medium such as polyethylene terephthalate (PET) or polycarbonate (PC), and light reflectivity of the reflective layer 211 may reach 90%. Each of the first substrate 210 and the second substrate 220 may be a transparent glass substrate. External light, such as ambient light and light emitted from the self-luminous light source, may enter the liquid crystal display panel 200 by passing through the transparent second substrate 220. The color filter layer 212 is substantially made of color resist material, including a red light color resist R, a green light color resist G and a blue light color resist B. The color resist R, the color resist G, and the color resist B may be spaced apart from each other.

According to FIG. 2, after the external light, such as the ambient light or the light emitted from the light source, enters the liquid crystal display panel 200 by passing through the second substrate 220, liquid crystal molecules 231 in the liquid crystal layer 230 may be controlled to be redirected. In this way, after the light reaches the color filter layer 212 on the first substrate 210, the light may be filtered by the color filter layer 212 to reach the reflective layer 211, and may be reflected by the reflective layer 211 to reach the second substrate 220. In the above process, as the color filter layer 212 is directly arranged on the reflective layer 211, a path length of the light transmitting from the color filter layer 212 to the reflective layer 211, or from the reflective layer 211 to the color filter layer 212, may be negligible. It may be interpreted as the light filtered by the color filter layer 212 being directly reflected back to the second substrate 220, and the light does not pass through a relatively long path and may not be filtered for the second time, reducing the loss rate of the light. Therefore, compared to the above-mentioned liquid crystal display panel 100 in the related art, the liquid crystal display panel 200 provided by the present disclosure may have a reduced loss rate of the light, an increased light utilization rate and an increased light reflectivity.

While producing the liquid crystal display panel 200, the color filter layer 212 may be obtained while producing the first substrate 210. For example, while performing a deposition process, an etching process, and so on, in the first substrate 210 to obtain the reflective layer 211, red color resist material may firstly be deposited on the reflective layer 211, the etching process may be performed on the red color resist material to obtain the red light color resist R. Subsequently, the green light color resist G and the blue light color resist B may be obtained in a same manner. In this way, the color filter layer 212 may be obtained. While producing the second substrate 220, the color filter layer 212 may not be required to be produced.

In other embodiments, in order to further shorten the length of the light filtered by the color filter layer 212 transmitting to reach the second substrate 220, the color filter layer 212 may be made to be capable of reflecting light to some extent. Specifically, reflective material may be doped with the color filter layer 212, i.e., the material for producing the red light color resistance R, the green light color resistance G and the blue light color resistance B may include the reflective material to improve the light reflectivity. Preferably, the reflective material may include metal, such as chromium, aluminum-titanium alloy, and the like. In this way, after the external light reaches the color filter layer 212, part of the light may be directly reflected back to the second substrate 220 due to the light-reflective property of the metal material, and may not be reflected by the reflective layer 211, such that the light path may be shortened, the loss rate of the light may be reduced. Remaining part of the light may be reflected by the reflective layer 211 to the second substrate 220. In this way, the light filtered by the color filter layer 212 may be utilized as much as possible, improving the light utilization rate.

It should be understood that, generally, when the external light passes through the second substrate 220 reaching the liquid crystal layer 230, the light may be refracted by the liquid crystal layer and may be divided into two beams propagating along two directions (not shown in the figure). One of the two beams is ordinary light (o light) and the other is extraordinary light (e light). Liquid crystal exhibits different refractive indices for the ordinary light and the extraordinary light. It is found that a refraction direction for the ordinary light remains the same when the liquid crystal molecules 231 are rotated, and a refraction direction for the extraordinary light changes as a rotation direction of the liquid crystal molecules 231 changes. It may indicate that the liquid crystal molecule 231 shows different refractive indices for the ordinary and extraordinary light. The refractive indices of the ordinary light may be equal in all directions within the liquid crystal molecules 231, and the speed of light is equal. Therefore, the refraction direction of the light remains the same. The refractive indices of the extraordinary light may not be equal in all directions within the liquid crystal molecules 231, and the speed of light may not be equal. Therefore, the refraction direction of the light may vary. When rotating the liquid crystal molecule 231 to a certain direction, the refraction direction of the ordinary light coincides with the refraction direction of the extraordinary light, and the certain direction of the rotated liquid crystal molecules 231 may be referred as an optical axis of the liquid crystal molecule 231. That is, when the light transmits along the optical axis, birefringence may not occur, and the transmitting direction of the light may remain unchanged. Generally, a direction of a long axis of the liquid crystal molecules 231 may be the optical axis. For positive liquid crystals, the long-axis direction of liquid crystal molecules 231 may be parallel to an electric field direction. For negative liquid crystals, the long-axis direction of liquid crystal molecules 231 may be perpendicular to the electric field direction.

Figure 3:
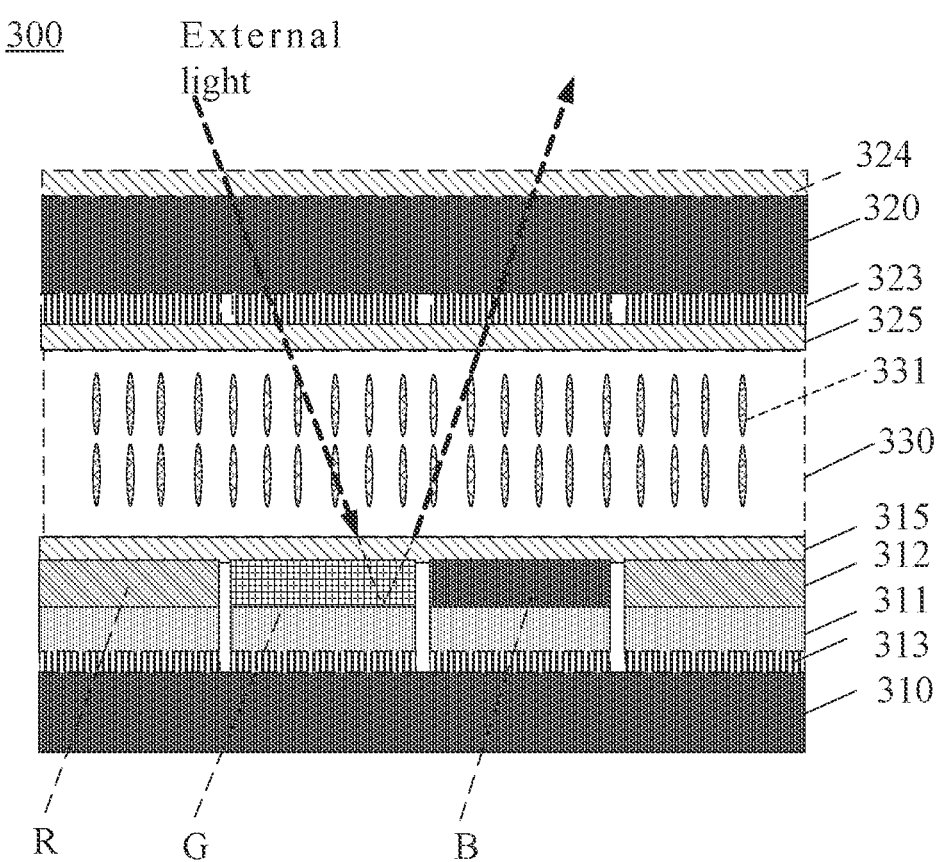
FIG. 3 is another structural schematic view of a cross section of a liquid crystal display panel according to an embodiment of the present disclosure.

As shown in FIG. 3, FIG. 3 is another structural schematic view of a cross section of a liquid crystal display panel 300 according to an embodiment of the present disclosure. The liquid crystal display panel 300 may include a first substrate 310, a second substrate 320, and a liquid crystal layer 330 disposed between the first substrate 310 and the second substrate 320. A side of the first substrate 310 facing the liquid crystal layer 330 may be arranged with a reflective layer 311 and a color filter layer 312 covering the reflective layer 311. Forward liquid crystal may be configured in the liquid crystal layer 330. A first electrode layer 313 may be disposed between the first substrate 310 and the reflective layer 311. Aside of the second substrate 320 facing the liquid crystal layer 330 may be arranged with a second electrode layer 323. An electric field may be generated by the first electrode layer 313 and the second electrode layer 323, causing liquid crystal molecules 331 in the liquid crystal layer 330 to rotate. A direction of the electric field (i.e., the longitudinal direction) may be parallel to a long-axis direction of the liquid crystal molecules 331.

In detail, the first electrode layer 313 may include a plurality of first electrodes spaced apart from each other, and the second electrode layer 323 may include a plurality of second electrodes spaced apart from each other. Material for making the first electrodes and the second electrodes may include indium tin oxide. A side of the second substrate 320 away from the liquid crystal layer 330 may be arranged with a polarizing plate 324. A side of the first electrode layer 313 facing the liquid crystal layer 330 may be arranged with a first alignment film 315. The first electrodes and the second electrodes may be disposed to be opposite to each other, and each of the plurality of first electrodes (or each of the plurality of second electrodes) may be controlled independently from each other, such that when different voltages are applied to different first electrodes and second electrodes, corresponding liquid crystal molecules 331 in the liquid crystal layer 330 may be controlled differentially. For example, when an initial orientation of the liquid crystal molecules 331 is horizontal, and when no voltage difference occurs between the first electrode and the corresponding second electrode, the corresponding liquid crystal molecules 331 may still be horizontally oriented, blocking the external light from entering the color filter layer 312. When voltage difference occurs between the first electrode and the corresponding second electrode, the corresponding liquid crystal molecules 331 may rotate to be vertically orientated (i.e., parallel to the optical axis), allowing the external light to enter the color filter layer 312.

Figure 5:
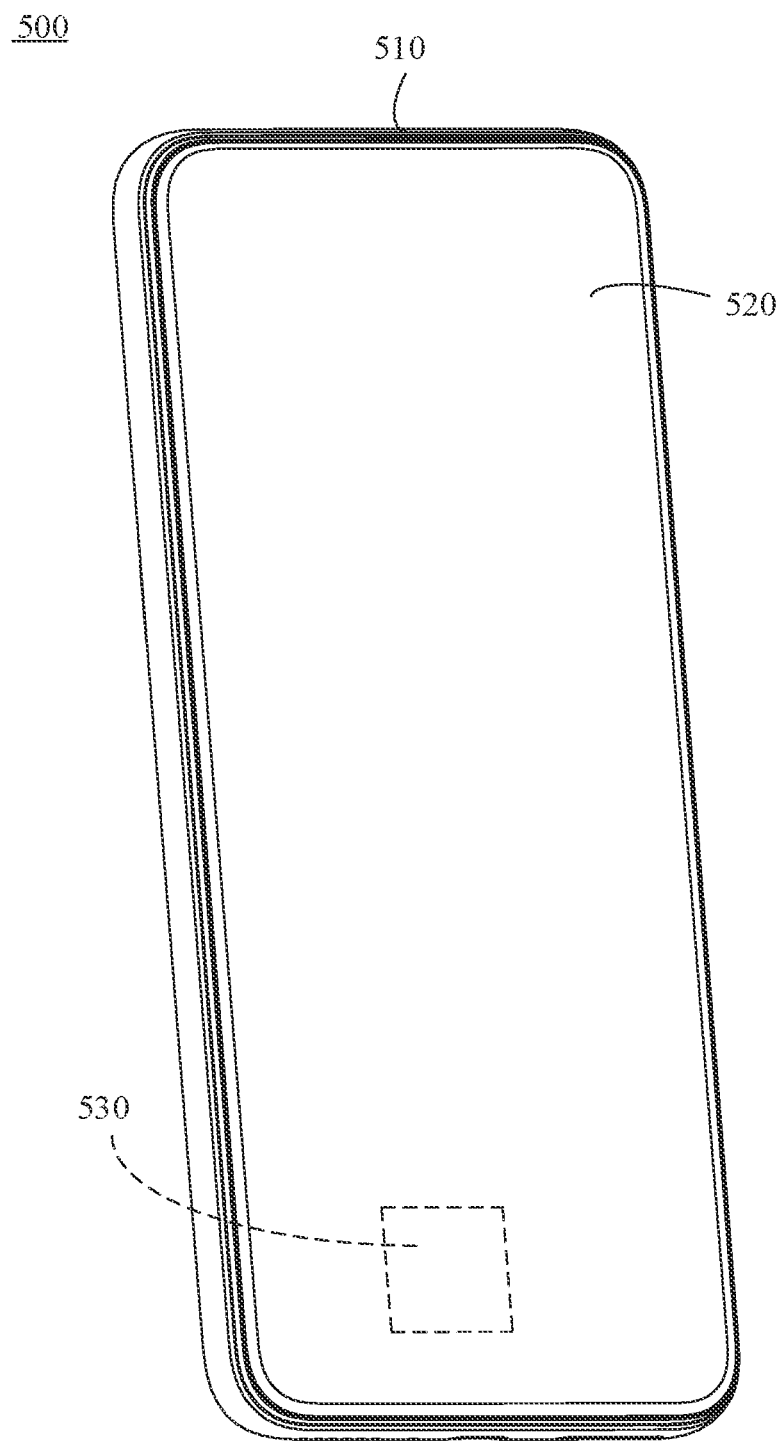
FIG. 5 is another structural view of a mobile terminal according to an embodiment of the present disclosure.

In addition, embodiments of the present disclosure also provide a liquid crystal display device 500, as shown in FIG. 5, including a shell 510 and any one of the above liquid crystal display panels 520 connected to the shell 510. The liquid crystal display device 500 may further include a control module 530, received in the shell 510 and configured to control a voltage to be applied to the first electrode layer and the second electrode layer, forming the electric field.

According to the above embodiments of the present disclosure, a liquid crystal display panel and a liquid crystal display device are provided. The liquid crystal display panel includes a first substrate, a second substrate, and a liquid crystal layer disposed between the first substrate and the second substrate. A side of the first substrate facing the liquid crystal layer may be arranged with a reflective layer. The first substrate may further be arranged with a color filter layer covering the reflective layer. When light passes through the second substrate reaching the color filter layer, the reflective layer may reflect the light, which is filtered by the color filter layer, to the second substrate. The liquid crystal display panel provided by the embodiment of the present disclosure may emit light without a light source, the loss rate of the light may be reduced, the light utilization rate may be improved, and the reflection rate of the liquid crystal display panel may be improved. The liquid crystal display panel may protect users' eyes, may be produced through a simple production process, and exhibit a good display effect.

Figure 4:
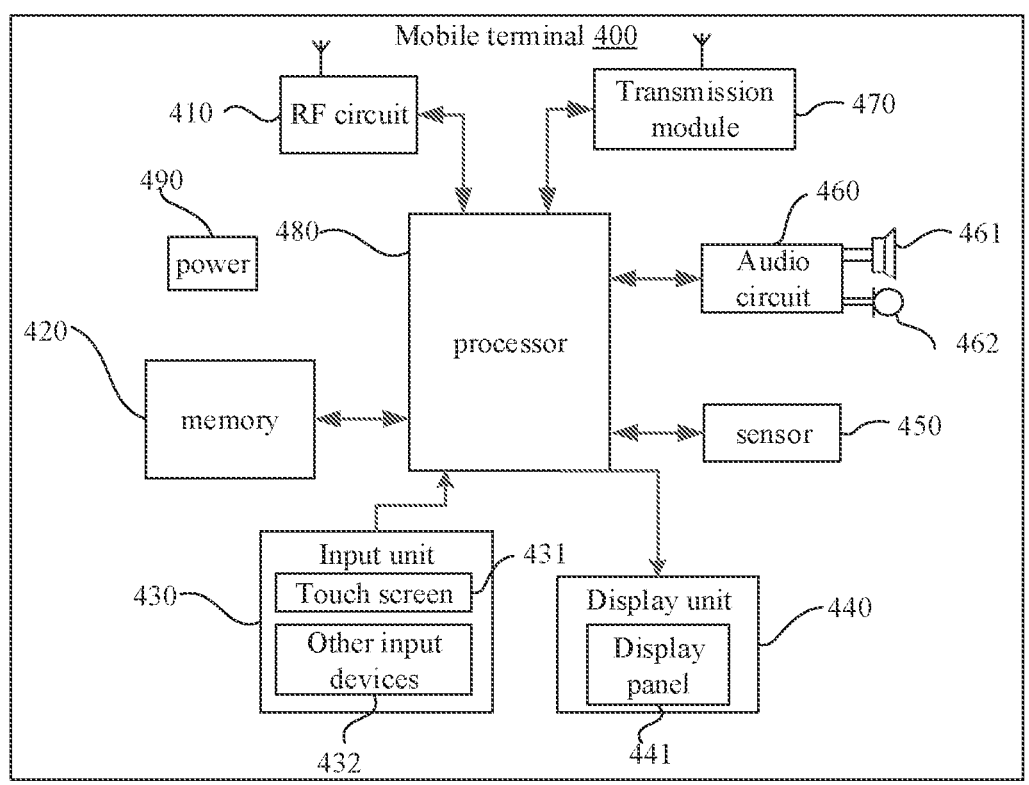
FIG. 4 is a structural view of a mobile terminal according to an embodiment of the present disclosure.

Further, the liquid crystal display device provided by the present embodiment may be applied to a mobile terminal, including a mobile phone, a computer, and the like. Referring to FIG. 4, FIG. 4 is a structural view of a mobile terminal according to an embodiment of the present disclosure. The mobile terminal 400 may include a RF circuit 410, a non-transitory memory 420, an input unit 430, a display unit 440, a sensor 450, an audio circuit 460, a transmission module 470, a processor 480, a power supply 490, and so on.

RF circuit 410 may be configured to receive and transmit electromagnetic waves, enabling interconversion between the electromagnetic waves and electrical signals, such that the mobile terminal may communicate with a communication network or other devices. The RF circuit 410 may include a circuit component available in the art, such as antennas, RF transceivers, digital signal processors, encryption/decryption chips, subscriber identity module (SIM) cards, memory, and the like, to achieve these functions. RF circuitry 410 may communicate through various networks, such as the Internet, a corporate intranet, a wireless network, or communicate with other devices through a wireless network. The above wireless network may include a cellular telephone network, a wireless local area network, or a metropolitan area network. The above-mentioned wireless network may use various communication standards, protocols and technologies, including, but not limited to, Global System for Mobile Communication (GSMC), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi) (e.g. IEEE 802.11a, IEEE 802.11b, IEEE 802.11g and/or IEEE 802.11n), Voice over Internet Protocol (VoIP), Worldwide Interoperability for Microwave Access (Wi-Max), other protocols for mail, instant messaging and SMS, and any other suitable communication protocols, and those that are not currently being developed.

The non-transitory memory 420 may be configured to store applications and data, and the applications stored in the non-transitory memory 420 may include executable codes or instructions. The processor 480 may perform various functional applications and process data by running the applications stored in the non-transitory memory 420. The non-transitory memory 420 may substantially include a program storage area and a data storage area. The program storage area may store an operating system, an application required for at least one function (e.g., a sound playback function, an image playback function, etc.), etc. The data storage area may store data created due to use of the mobile terminal (e.g., audio data, a contact list, etc.), etc. In addition, the non-transitory memory 420 may include a high-speed random access memory, and a non-volatile memory, such as at least one disk memory device, a flash memory device, or other volatile solid state memory devices. Accordingly, the non-transitory memory 420 may further include a memory controller to provide access to the non-transitory memory 420 for the processor 480 and the input unit 430.

The input unit 430 may be configured to receive inputted numeric or character information and to generate a signal input of a keyboard, a mouse, a joystick, an optical or a trackball related to user settings and control of functions. In detail, the input unit 430 may include a touch screen 431 and other input devices 432. The touch screen 431, also referred as a touch display or a touch pad, may collect touch operations performed by the user on or near the touch screen (e.g., operations performed on or near touch screen 431 by using any suitable object or attachment such as a finger, stylus, etc.). The touch screen 431 may drive a corresponding connection device based on a predetermined program. Alternatively, the touch screen 431 may include two portions, a touch detection device and a touch controller. The touch detection device detects a position of the user's touch, detects a signal brought by the touch operation, and the signal to the touch controller. The touch controller receives the touch information sent from the touch detection device, converts the touch information into contact coordinates, sends the contact coordinates to the processor 480, and receives and executes commands sent from the processor 480. In addition, the touch screen 431 may be configured in various forms, such as being resistive, being capacitive, being infrared, and taking surface acoustic waves. In addition to the touch screen 431, the input unit 43 may further include other input devices 432. In detail, the other input devices 432 may include, but are not limited to, one or more of a physical keyboard, a function key (such as a volume control button, a switch button, etc.), a trackball, a mouse, an operating stick, etc.

The display unit 440 may be configured to display information inputted by or provided for the user and various graphical user interfaces of the mobile terminal 400. The graphical user interfaces may include graphics, text, icons, video, and any combination thereof. The display unit 440 may include a display panel 441. Although the touch screen 431 and the display panel 441 may be configured as two separate components to implement input and output functions, in some embodiments, the touch screen 431 and the display panel 441 may be integrated into one component to implement the input and output functions.

The mobile terminal 400 may include at least one sensor 450, such as a light sensor, a motion sensor, and other sensors. In detail, the light sensor may include an ambient light sensor and a proximity sensor. The ambient light sensor may adjust brightness of the display panel 441 based on brightness of the ambient light. The proximity sensor may turn off the display panel 441 when the mobile terminal 400 moves close to an ear. As a type of motion sensor, a gravitation sensor may detect acceleration along each direction (generally along three axes). Magnitude and a direction of the gravity may be detected when the mobile terminal is at rest. The gravitation sensor may be applied in applications that identify postures of the mobile terminal (such as horizontal and vertical screen switching, related games, magnetometer posture calibration), vibration identification-related functions (such as pedometer, knocking), etc. The mobile terminal 400 may further be configured with other sensors, such as a gyroscope, a barometer, a hygrometer, a thermometer, an infrared sensor, etc., which will not be described in detail hereinafter.

The audio circuit 460 may be configured with a speaker 461 and a microphone 462 to provide an audio interface between the user and the mobile terminal 400. The audio circuit 460 may receive an electrical signal converted from audio data, and transmit the electrical signal to the speaker 461. The speaker 461 may convert the electrical signal into an audio signal and output the audio signal. Further, the microphone 462 converts the collected audio signal into the electrical signal, the electrical signal may be received by the audio circuit 460 and converted into the audio data. The audio circuit 460 may output the audio data to the processor 480. The processor 480 may process the audio data, and send the audio data to another mobile terminal through the RF circuit 410, or output the audio data to the non-transitory memory 420 for further processing. The audio circuitry 460 may define an earbud jack to provide communication between a peripheral earphone and the mobile terminal 400.

The mobile terminal 400 may enable users to send and receive e-mails, browse websites, and access streaming media, through the transmission module 470 (e.g., a Wi-Fi module), and the Wi-Fi module provides wireless broadband Internet access for the users.

The processor 480 may be a control center of the mobile terminal 400, and connects various parts of the mobile terminal 400 through various interfaces and lines. The processor 480 is electrically connected to the non-transitory memory 420. The processor 480 may perform various functions and process data of the mobile terminal 400 by running or executing applications stored in the non-transitory memory 420 and by invoking data stored in the non-transitory memory 420, such that the mobile terminal may be monitored by the processor 480. Alternatively, the processor 480 may include one or more processing cores. In some embodiments, the processor 480 may integrate an application processor and a modem processor. The application processor may manage the operating system, user interfaces, applications, and so on. The modem processor may manage wireless communication. It should be understood that the above modem processor may not be integrated into the processor 480.

The mobile terminal 400 may further include a power 490 (e.g., a battery) that supply power for various components. In some embodiments, the power may be logically connected to the processor 480 through a power management system, such that charging, discharging, and power consumption management may be achieved through a power management system. The power 490 may further include one or more DC or AC power sources, a re-charging system, a power failure detection circuit, a power converter or inverter, a power status indicator, and any other component. Although not shown, the mobile terminal 400 may further include a camera (e.g., front camera, rear camera), a Bluetooth module, etc., which will not be described in detail herein.

The above embodiments are described to help understand the technical solution and the essential concept of the present disclosure. A person of ordinary skill in the art should understand that the technical solution described in the above embodiments may be modified, or equivalent substitution may be performed on some of the technical features. The modification or substitution do not cause the essence of the technical solution to depart away from the scope of the embodiments of the present disclosure.

What is claimed is:

1. A liquid crystal display panel, comprising:
   a first substrate;
   a second substrate;
   a liquid crystal layer, disposed between the first substrate and the second substrate;
   a reflective layer, disposed on a side of the first substrate facing the liquid crystal layer; and
   a color filter layer, directly disposed on the reflective layer and covering the reflective layer, wherein
   the color filter layer directly contacts the reflective layer; and
   when light passes through the second substrate reaching the color filter layer, the reflective layer is configured to reflect the light, which is filtered by the color filter layer, to the second substrate;
   wherein a first electrode layer is disposed between the first substrate and the reflective layer, a second electrode layer is disposed on a side of the second substrate facing the liquid crystal layer, and an electric field is generated by the first electrode layer and the second electrode layer causing liquid crystal molecules in the liquid crystal layer to rotate.

2. The liquid crystal display panel according to claim 1, wherein the color filter layer comprises a red light color resist, a green light color resist, and a blue light color resist.

3. The liquid crystal display panel according to claim 2, wherein material of the red light color resist, the green light color resist, and the blue light color resist comprises light reflective material for improving light reflectivity.

4. The liquid crystal display panel according to claim 3, wherein the light reflective material comprises metal.

5. The liquid crystal display panel according to claim 1, wherein when the liquid crystal molecules are vertically orientated under the electric field, the light reaching the second substrate pass through the liquid crystal layer reaching the color filter layer, and is reflected by the reflective layer reaching the second substrate.

6. The liquid crystal display panel according to claim 1, wherein the first electrode layer comprises a plurality of first electrodes spaced apart from each other, the second electrode layer comprises a plurality of second electrodes spaced apart from each other, and material of the first electrodes and the second electrodes comprises indium tin oxide.

7. The liquid crystal display panel according to claim 1, wherein each of the first substrate and the second substrate is a transparent glass substrate.

8. The liquid crystal display panel according to claim 1, wherein a polarizing plate is disposed on a side of the second substrate away from the liquid crystal layer.

9. A liquid crystal display device, comprising:
   a shell;
   a liquid crystal display panel, connected to the shell; and
   a control module, received in the shell and configured to apply voltages to form an electric field for the liquid crystal display panel, wherein
   the liquid crystal display panel comprises:
   a first substrate;
   a second substrate;
   a liquid crystal layer, disposed between the first substrate and the second substrate;
   a reflective layer, disposed on a side of the first substrate facing the liquid crystal layer; and
   a color filter layer, directly disposed on the reflective layer and covering the reflective layer, wherein
   the color filter layer directly contacts the reflective layer; and
   when light passes through the second substrate reaching the color filter layer, the reflective layer is configured to reflect the light, which is filtered by the color filter layer, to the second substrate;
   wherein a first electrode layer is disposed between the first substrate and the reflective layer, a second electrode layer is disposed on a side of the second substrate facing the liquid crystal layer, and an electric field is generated by the first electrode layer and the second electrode layer causing liquid crystal molecules in the liquid crystal layer to rotate.

10. The liquid crystal display device according to claim 9, wherein the color filter layer comprises a red light color resist, a green light color resist, and a blue light color resist.

11. The liquid crystal display device according to claim 10, wherein material of the red light color resist, the green light color resist, and the blue light color resist comprises light reflective material for improving light reflectivity.

12. The liquid crystal display device according to claim 11, wherein the light reflective material comprises metal.

13. The liquid crystal display device according to claim 9, wherein when the liquid crystal molecules are vertically orientated under the electric field, the light reaching the second substrate pass through the liquid crystal layer reaching the color filter layer, and is reflected by the reflective layer reaching the second substrate.

14. The liquid crystal display device according to claim 9, wherein the first electrode layer comprises a plurality of first electrodes spaced apart from each other, the second electrode layer comprises a plurality of second electrodes spaced apart from each other, and material of the first electrodes and the second electrodes comprises indium tin oxide.

15. The liquid crystal display device according to claim 9, wherein each of the first substrate and the second substrate is a transparent glass substrate.

16. The liquid crystal display device according to claim 9, wherein a polarizing plate is disposed on a side of the second substrate away from the liquid crystal layer.

\* \* \* \* \*